US012160038B2

(12) United States Patent
Nair et al.

(10) Patent No.: US 12,160,038 B2
(45) Date of Patent: Dec. 3, 2024

(54) ANTENNA ARRAY ASSEMBLY HAVING HIGH CROSS POLAR ISOLATION

(71) Applicant: Cambium Networks Ltd, Devon (GB)

(72) Inventors: Deepu Nair, Karnataka (IN); Jomon Thomas, Karnataka (IN); Varun Hegde, Karnataka (IN); Visalakshy TC, Karnataka (IN); Nigel King, Devon (GB)

(73) Assignee: Cambium Networks Ltd, Ashburton (GB)

( * ) Notice: Subject to any disclaimer, the term of this patent is extended or adjusted under 35 U.S.C. 154(b) by 225 days.

(21) Appl. No.: 17/534,005

(22) Filed: Nov. 23, 2021

(65) Prior Publication Data

US 2022/0085496 A1 Mar. 17, 2022

Related U.S. Application Data

(63) Continuation of application No. PCT/GB2020/051230, filed on May 20, 2020.

(30) Foreign Application Priority Data

May 23, 2019 (IN) ............................ 201941020484

(51) Int. Cl.
*H01Q 1/52* (2006.01)
*H01Q 9/04* (2006.01)
(Continued)

(52) U.S. Cl.
CPC ........... *H01Q 1/523* (2013.01); *H01Q 9/0414* (2013.01); *H01Q 21/08* (2013.01); *H01Q 1/246* (2013.01); *H01Q 1/48* (2013.01)

(58) Field of Classification Search
CPC ............ H01Q 1/246; H01Q 1/42; H01Q 1/48; H01Q 1/523; H01Q 19/028; H01Q 19/106; H01Q 21/08; H01Q 21/24; H01Q 9/0414
See application file for complete search history.

(56) References Cited

U.S. PATENT DOCUMENTS 4,924,236 A * 5/1990 Schuss ................. H01Q 9/0442 343/859
5,400,040 A * 3/1995 Lane ...................... H01Q 1/286 343/822

(Continued)

FOREIGN PATENT DOCUMENTS

| | | |
|---|---|---|
| IN | 201941020484 A | 11/2020 |
| WO | WO 1998/36472 | 8/1998 |

(Continued)

OTHER PUBLICATIONS

International Search Report and Written Opinion of corresponding PCT Application No. PCT/GB2020/051230 mailed on Oct. 2, 2020 (15 pages).

(Continued)

*Primary Examiner* — Thien M Le
(74) *Attorney, Agent, or Firm* — Crowell & Moring LLP

(57) ABSTRACT

An antenna array assembly comprises a ground plate, a linear array of patch radiator elements disposed in a spaced parallel relationship with a first face of the ground plate and a first and second elongate passive radiator each comprising a plurality of conductive parts electrically isolated from the ground plate. The first and second elongate passive radiators are disposed symmetrically on either side of the linear array and parallel to a centre line of the linear array, on the same side of the ground plate as the linear array. At least some of the conductive parts of a respective elongate passive radiator are disposed in an arrangement having parallel ridges and
(Continued)

grooves, in which, in a cross section in a plane parallel to the first face of the ground plate, the ridges extend towards the linear array and the grooves extend away from the linear array.

21 Claims, 7 Drawing Sheets

(51) Int. Cl.

| | |
|---|---|
| ***H01Q 21/08*** | (2006.01) |
| *H01Q 1/24* | (2006.01) |
| *H01Q 1/48* | (2006.01) |

(56) References Cited

U.S. PATENT DOCUMENTS

| | | | | |
|---|---|---|---|---|
| 6,144,344 | A * | 11/2000 | Kim | H01Q 21/10 343/789 |
| 6,388,622 | B1 * | 5/2002 | Jennetti | H01Q 21/065 343/872 |
| 10,186,778 | B2 * | 1/2019 | Zemliakov | H01Q 21/0075 |
| 2003/0043076 | A1 | 3/2003 | Carson et al. | |
| 2005/0225498 | A1 * | 10/2005 | Koparan | H01Q 1/246 343/895 |
| 2011/0063190 | A1 * | 3/2011 | Ho | H01Q 21/30 343/912 |
| 2011/0260941 | A1 * | 10/2011 | Jones | H01Q 21/26 343/772 |
| 2014/0168027 | A1 | 6/2014 | Katipally | |
| 2015/0123865 | A1 * | 5/2015 | Dobric | H01Q 19/005 343/833 |
| 2017/0040679 | A1 | 2/2017 | Fröhler et al. | |
| 2017/0271758 | A1 * | 9/2017 | Nair | H01Q 19/106 |
| 2017/0271767 | A1 * | 9/2017 | Nair | H01Q 9/0407 |
| 2018/0006367 | A1 | 1/2018 | Clark et al. | |

FOREIGN PATENT DOCUMENTS

| | | |
|---|---|---|
| WO | WO 2018/209577 A1 | 11/2018 |
| WO | WO 2020/234589 A1 | 11/2020 |

OTHER PUBLICATIONS

First Examination Report for India Application No. 201941020484 dated Dec. 8, 2023 (6 pp.).

* cited by examiner

ANTENNA ARRAY ASSEMBLY HAVING HIGH CROSS POLAR ISOLATION

CROSS-REFERENCE TO RELATED APPLICATIONS

This application is a continuation of International Patent Application No. PCT/GB2020/051230 filed on May 20, 2020, and published in English as WO 2020/234589 A1 on Nov. 26, 2020, which claims priority from Indian Application No. 201941020484, filed on May 23, 2019, the entirety of each of which are hereby fully incorporated by reference.

TECHNICAL FIELD

The present invention relates generally to an antenna array, and more specifically, but not exclusively, to an antenna array assembly for a cellular wireless sector antenna having high cross-polar isolation.

BACKGROUND

In modern wireless systems, such as, for example, cellular wireless access and fixed wireless access networks, there is a need for equipment, such as radio transceiver equipment in user equipment or at base stations or access points, which is economical to produce, while having high performance at radio frequencies. Increasingly high radio frequencies are being used as spectrum becomes scarce and demand for bandwidth increases. Furthermore, antenna systems are becoming increasingly sophisticated, often employing arrays of antenna elements to provide controlled beam shapes and/or MIMO (multiple input multiple output) transmission.

It is known to implement a radio transceiver having an array of antenna radiator elements. A feed network may connect the antenna elements to transmit and receive chains of the transceiver. A ground plate may be provided, which may underlie the array of radiator elements, and which provides a radio frequency ground for the radiator elements. Dual polar radiating elements may be provided, which may transmit, and/or receive, different signals on nominally orthogonal polarisations.

In some arrangements of a cellular wireless networks, in particular in LTE 4G networks, it may beneficial to operate with a frequency plan having a frequency re-use factor of 1, that is to say that adjacent sectors are operated using the same frequency band. In this case, signals transmitted in one sector may appear as interference to the adjacent sector. The coding and modulation schemes used for the transmission and reception of signals provide a tolerance of interference from other sectors, but there is typically some reduction in capacity at the boundaries between sectors. Ideally a sector antenna would have a flat, i.e. constant gain over the width of the sector in the main beam, and then a sharp cut off at angles outside the sector to minimise interference to an adjacent sector. A single linear array of patch antennas may conventionally be used as a sector antenna, for example covering a 120 degree sector, but the performance may be limited in terms of gain flatness within the sector and rate of cut-off outside the sector. It may be possible to modify a beam shape by means of passive radiators, but this may cause unwanted coupling between the signals for nominally orthogonal polarisations.

It is an object of the invention to mitigate the problems of the prior art.

SUMMARY

In accordance with a first aspect of the present invention, there is provided an antenna array assembly, comprising:

a ground plate;

a linear array of patch radiator elements disposed in a spaced parallel relationship with a first face of the ground plate; and a first and second elongate passive radiator each comprising a plurality of conductive parts each disposed to be generally upstanding in relation to the first face of the ground plate and being electrically isolated from the ground plate, the first and second elongate passive radiators being disposed symmetrically on either side of the linear array and parallel to a centre line of the linear array, on the same side of the ground plate as the linear array, wherein at least some of the conductive parts of a respective elongate passive radiator are disposed in an arrangement having parallel ridges and grooves, in which, in a cross section in a plane parallel to the first face of the ground plate, the ridges extend towards the linear array and the grooves extend away from the linear array.

The arrangement of parallel ridges and grooves increases isolation between signals transmitted and/or received by the patch radiator elements for a first and second polarisation, by receiving and re-radiating signals in such a way as to regenerate co-polarised fields for each respective polarisation and to reduce re-radiation at a different polarisation from the polarisation that is received, as compared to a flat passive radiator.

In an embodiment of the invention, at least some of the conductive parts are arranged as alternating first and second substantially planar conductive parts, the first substantially planar conductive parts being disposed at a first angle to the centre line of the linear array, and the second substantially planar conductive parts being disposed at a second angle to the centre line of the linear array, a transition between adjacent first and second substantially planar conductive parts forming a respective one of the ridges.

The arrangement of alternating first and second substantially planar conductive parts, the first substantially planar conductive parts being disposed at a first angle and the second substantially planar conductive parts being disposed at a second angle increases isolation between signals transmitted and/or received by the patch radiator elements for a first and second polarisation, by receiving and re-radiating signals in such a way as to regenerate co-polarised fields for each respective polarisation, the first substantially planar conductive parts being arranged to regenerate co-polarised field for a first polarisation, and the second substantially planar conductive parts being arranged to regenerate co-polarised field for a second polarisation.

In an embodiment of the invention, each patch radiator element is configured to radiate at orthogonal polarisations substantially +/−45 degrees to the centre line of the linear array. Embodiments of the invention are particularly effective at increasing isolation between signals transmitted and/or received by the patch radiator elements for slant polarisations, in particular polarisations substantially +/−45 degrees to the centre line of the linear array.

In an embodiment of the invention, the first and second substantially planar conductive parts are arranged in a zigzag arrangement in a cross-section taken in a plane parallel to the first face of the ground plane. This arrangement is particularly effective for use with slant polarisations.

In an embodiment of the invention, an angle between the first and second substantially planar conductive parts is substantially a right angle.

This arrangement is particularly effective for use with polarisations substantially +/−45 degrees to the centre line of the linear array.

In an embodiment of the invention, at least some of the conductive parts have a cross-section comprising part of a circle. This provides an alternative to the zig-zag arrangement with straight sides.

In an embodiment of the invention, a width of each of the first and second elongate passive radiators measured in a direction pointing away from the first face of the ground plate is in the range 0.4 to 0.6 wavelengths, and in an example substantially half a wavelength, at a operating frequency of the antenna array assembly. This has been found to give a particularly good combination of beam shape and cross-polar isolation.

In an embodiment of the invention, each of the first and second elongate passive radiators is disposed 0.4 to 0.6 wavelengths, and in an example substantially half a wavelength, away from a centre line of the linear array of patch radiator elements at at least one operating frequency of the antenna array assembly, measured in a plane parallel to the first face of the ground plate. This has been found to give a particularly good combination of beam shape and cross-polar isolation.

In an embodiment of the invention, each of the first and second elongate passive radiators is inclined towards the linear array of patch radiator elements by an angle of up to 10 degrees from perpendicular to the first face of the ground plate. This has been found to give a particularly good combination of beam shape and cross-polar isolation.

In an embodiment of the invention, each of the first and second elongate passive radiators is composed of a series of sections, each comprising one or more conductive parts, wherein a gap is provided between each section of 0.2 to 0.4 wavelengths, and in an example substantially a quarter of a wavelength, at at least one operating frequency of the antenna array assembly. This provides improved isolation between patch antenna elements, that is to say reduced mutual coupling, while maintaining good cross-polar isolation.

In an embodiment of the invention, each section has a length measured in a direction parallel to the centre line of the linear array in the range 0.4 to 0.6 wavelength, and in an example substantially half a wavelength, at at least one operating frequency of the antenna array assembly. This allows the sections to align with respective patch antenna elements and provides good cross-polar isolation.

In an embodiment of the invention, at least two ridges of a respective elongate passive radiator are spaced by between one sixteenth and one quarter of a wavelength, and in an example substantially one eighth of a wavelength, at at least one operating frequency of the antenna array assembly. This provides good cross polar isolation.

In an embodiment of the invention, the antenna array assembly comprises a first and second elongate conductive wall each being disposed symmetrically on either side of the linear array and parallel to a centre line of the linear array, on the same side of the ground plate as the linear array, and closer to the linear array than are the first and second elongate passive radiators, wherein the first and second elongate conductive walls are electrically connected to the first face of the ground plate and are substantially perpendicular to the first face of the ground plate, protruding from the ground plate by less than a quarter of a wavelength at at least one operating frequency of the antenna array assembly. This may improve the beam shape in conjunction with the passive radiators.

In an embodiment of the invention, the ground plate comprises a base plate to which the first and second elongate passive radiators are mounted and a raised section disposed between the base plate and the patch radiator elements comprising at least part of the first face of the ground plate.

This may provide a convenient base for mounting the patch radiator elements.

In an embodiment of the invention, each patch radiator element comprises a first planar part disposed in a spaced parallel relationship to the first face of the ground plate and a second planar part disposed in a spaced parallel relationship to the first planar part, on the side of the first planar part away from the first face of the ground plate.

This may provide an improved radiated and/or received beam pattern.

Further features and advantages of the invention will be apparent from the following description of preferred embodiments of the invention, which are given by way of example only.

DETAILED DESCRIPTION

By way of example, embodiments of the invention will now be described in the context of an antenna array assembly having a ground plate which is a backing plate for an array of printed antenna elements for use as a sector antenna for an access point of a fixed wireless access system operating according to a 4G LTE coding, modulation and signalling scheme. However, it will be understood that this is by way of example only and that other embodiments may be antenna array assemblies in other wireless systems, including mobile wireless systems operating according to 3GPP 4G LTE standards, and according to 5G or other standards, operating in a variety of signal transmission bands. In an embodiment of the invention, an operating frequency band of approximately 2.3-2.7 GHz, with a centre frequency of 2.5 GHz, is used, but the embodiments of the invention are not restricted to this frequency, and in particular embodiments of the invention are suitable for use at lower or higher operating frequencies of up to 20 GHz or even higher.

FIGS. 1, 2, 4, 6 and 7 show parts of an antenna array assembly in an embodiment of the invention. As shown, a linear array of patch radiator elements 12*a*-12*d*, 11*a*-11*d* have a spaced parallel relationship with a first face of a ground plate 1, 14. The patch radiator elements may be substantially planar and have a parallel spaced relationship with the first face of the ground plate. The patch radiator elements are typically each connected to one or more transmission lines, which may be part of a feed network, to connect each patch radiator element to a source or sources of radio frequency signals for transmission, and/or a receiver or receivers of radio frequency signals for reception. The first face is the side facing the patch radiator elements, and may have a substantially planar centre section 14 underlying the patch radiator elements which is raised towards the patch radiator elements with respect to substantially planar parts either side of the centre section. The ground plate is a conductive, typically metallic structure and may comprise two or more parts, for example the centre section may be manufactured as a separate piece and mounted to a lower section underlying the centre section and forming the substantially planar parts either side of the centre section. The parts of the ground plate may be connected together electrically, by contact and/or by metallic fixings, to form a single grounded structure, providing a radio frequency ground for the radiator elements and feed tracks that may be provided to conduct signals to and/or from the patch radiator elements.

Figure 1:
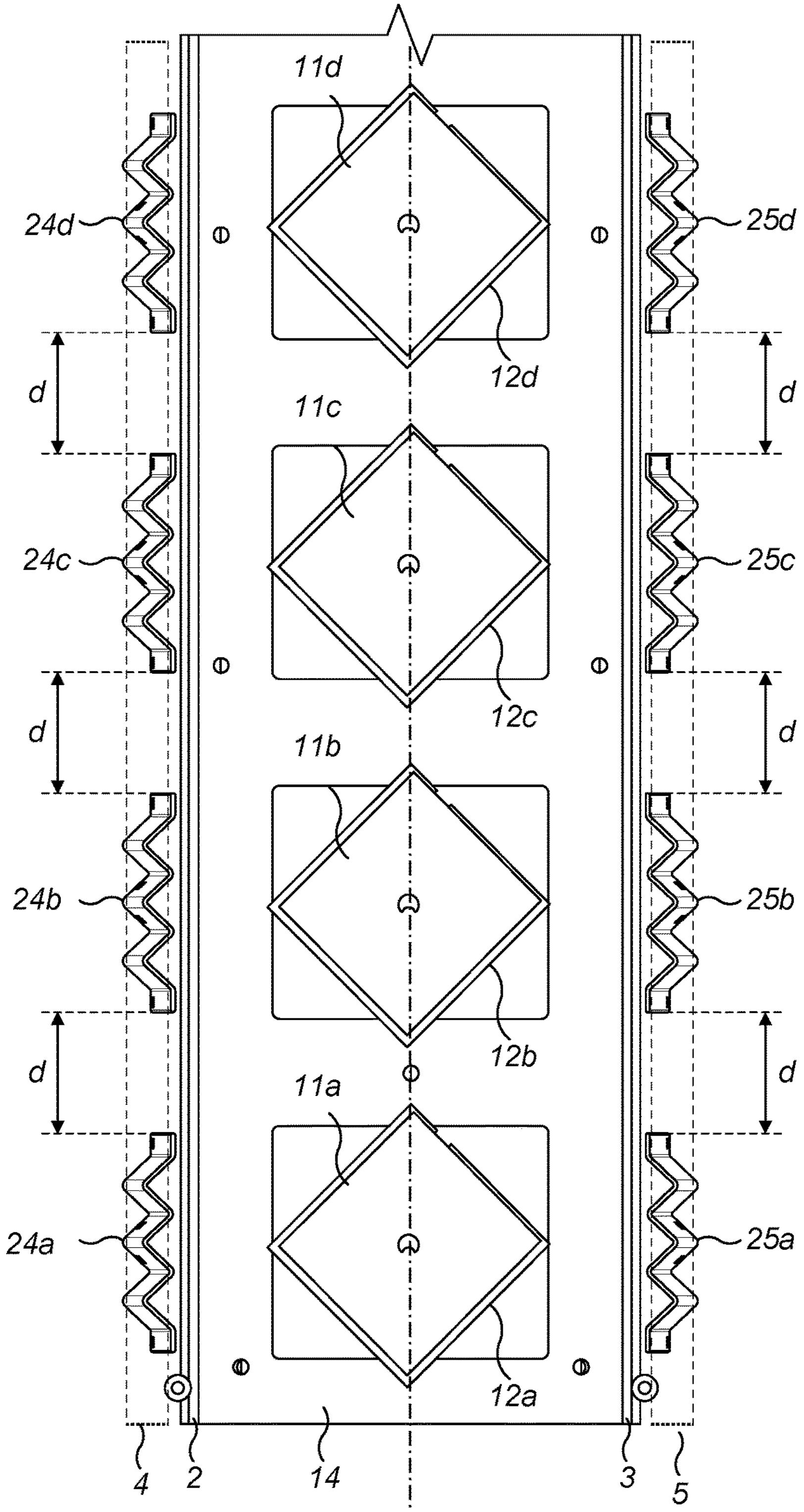
FIG. 1 shows a plan view of part of an embodiment of the antenna array assembly.
Figure 2:
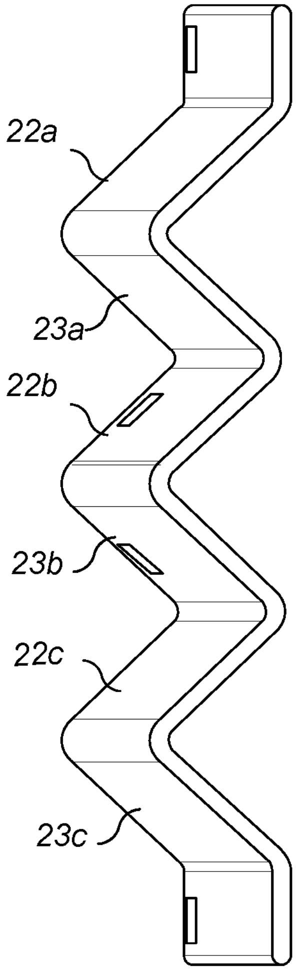
FIG. 2 shows a plan view of a section of an elongate passive radiator in an arrangement of alternating first and second substantially planar conductive parts.

As may be seen from FIG. 1 in plan view, the antenna array assembly is provided with a first and second elongate passive radiator 4, 5 which are placed symmetrically on either side of the linear array and parallel to a centre line of the linear array, on the same side of the ground plate as the linear array. The first and second elongate passive radiators 4, 5 are electrically isolated from the ground plate and from each other, acting as parasitic flanges, which may receive and re-radiate radiation. The electrical isolation is at least a radio frequency isolation. The first and second elongate passive radiators 4, 5 may be composed of several conductive parts. In some embodiments the conductive parts may be substantially planar, and/or they may be curved. In the embodiment shown, each first and second elongate passive radiator 4, 5 is composed of a series of sections 24*a*-24*d* and 25*a*-25*d* distributed along the length of the radiator with gaps d in between the sections. The sections 24*a*-24*d* and 25*a*-25*d* themselves may each be composed of one or more conductive parts 22*a*-22*c* and 23*a*-23*c*, for example arranged in a zig-zag arrangement when seen in plan view as shown in FIG. 2. The parts arranged in the zig-zag may each be substantially planar, which may be connected by right angled corners or by curved sections. The sections may be corrugated and/or scalloped, and may comprise a series of alternating ridges and furrows, that is to say ridges and grooves. The sections between ridges may be substantially semi-circular in cross-section when seen in plan view. An elongate passive radiator may be also be referred to as a radiator arrangement, an array of one or more radiator elements, or a passive radiating barrier.

In an embodiment of the invention, the first and second elongate passive radiators 4, 5 may be perpendicular to the first face of the ground plate. However, the first and second elongate passive radiators 4, 5 may in alternative arrangements be generally upstanding from the ground plate, but at an angle to the perpendicular. The one or more substantially planar conductive parts may be disposed to be generally upstanding in relation to the first face of the ground plate, in some embodiments being disposed at an angle of at least 75 degrees to the first face of the ground plate, and in an example disposed at an angle of substantially 85 degrees to the first face of the ground plate, that is to say offset from the vertical by about 5 degrees in some embodiments.

As shown in FIGS. 1 and 2, at least some of the conductive parts (22*a*-22*c*, 23*a*-23*c*) of a respective elongate passive radiator are disposed in an arrangement having parallel ridges and grooves, in which, in a cross section in a plane parallel to the first face of the ground plate, the ridges extend towards the linear array and the grooves extend away from the linear array. As illustrated in FIGS. 1 and 2, the conductive parts (22*a*-22*c*, 23*a*-23*c*) are substantially planar. In alternative embodiments, at least some of the conductive parts have a cross-section comprising part of a circle, for example forming a scalloped arrangement with curved grooves between ridges.

As shown in FIGS. 1 and 2, at least some of the substantially planar conductive parts of a respective elongate passive radiator 4, 5 are disposed in an arrangement of alternating first 22*a*-22*c* and second 23*a*-23*c* substantially planar conductive parts, the first substantially planar conductive parts being disposed at a first angle to the centre line of the linear array, and the second substantially planar conductive parts being disposed at a second angle to the centre line of the linear array. The arrangement of alternating first and second substantially planar conductive parts, the first substantially planar conductive parts being disposed at a first angle and the second substantially planar conductive parts being disposed at a second angle increases isolation between signals transmitted and/or received by the patch radiator elements for a first and second polarisation, by receiving and re-radiating signals in such a way as to regenerate co-polarised fields for each respective polarisation, the first substantially planar conductive parts being arranged to regenerate co-polarised field for a first polarisation, and the second substantially planar conductive parts being arranged to regenerate co-polarised field for a second polarisation. This allows the passive radiators to regenerate fields that are used to shape the beamwidth, while mitigating coupling from one polarisation to the other. In effect, the first substantially planar conductive parts are used to regenerate signals at one polarisation, and the second substantially planar conductive parts are used to regenerate signals at the other polarisation. In this way, each passive radiator avoids retransmitting signals at one polarisation which were received at another polarisation, especially in the case of polarisations oblique to the centre line of the array.

In the embodiment illustrated in FIGS. 1, 2, 6 and 7, each patch radiator element 12*a*-12*d*, 11*a*-11*d* is configured to radiate at two orthogonal polarisations substantially +/−45 degrees to the centre line of the linear array. Embodiments of the invention are particularly effective at increasing isolation between signals transmitted and/or received by the patch radiator elements for slant polarisations, in particular polarisations substantially +/−45 degrees to the centre line of the linear array. As shown in particular in FIG. 2, the first 22*a*-22*c* and second 23*a*-23*c* substantially planar conductive parts are arranged in a zigzag arrangement in a cross-section taken in a plane parallel to the first face of the ground plane. This arrangement is particularly effective for use with slant polarisations. In the example shown, an angle between the first and second substantially planar conductive parts is substantially a right angle. This arrangement is particularly effective for use with polarisations substantially +/−45 degrees to the centre line of the linear array.

In an embodiment of the invention, a width of each of the first and second elongate passive radiators 4, 5 measured in a direction pointing away from the first face of the ground plate is in the range 0.4 to 0.6 wavelengths, and in an example substantially half a wavelength, at a operating frequency of the antenna array assembly. This has been found to give a particularly good combination of beam shape and cross-polar isolation. In the embodiment shown, each of the first and second elongate passive radiators 4, 5 is disposed 0.4 to 0.6 wavelengths, and in an example substantially half a wavelength, away from a centre line of the linear array of patch radiator elements at at least one operating frequency of the antenna array assembly. This has been found to give a particularly good combination of beam shape and cross-polar isolation. In an example, each of the first and second elongate passive radiators 4, 5 is inclined towards the linear array of patch radiator elements by an angle of 10-20 degrees from perpendicular to the first face of the ground plate. This has been found to give a particularly good combination of beam shape and cross-polar isolation.

In an embodiment of the invention illustrated in FIGS. 1 and 2 each of the first and second elongate passive radiators 4, 5 is composed of a series of sections 24*a*-24*d* and 25*a*-25*d*, each comprising one or more substantially planar conductive parts 22*a*-22*c*, 23*a*-23*c*, wherein a gap d is provided between each section of 0.2 to 0.4 wavelengths, and in an example substantially a quarter of a wavelength, at at least one operating frequency of the antenna array assembly. This provides improved insolation between patch antenna elements, that is to say reduced mutual coupling, while maintaining good cross-polar isolation. In an embodiment, each section 24*a*-24*d* and 25*a*-25*d* 2 has a length measured in a direction parallel to the centre line of the linear array in the range 0.4 to 0.6 wavelength, and in an example substantially half a wavelength, at at least one operating frequency of the antenna array assembly. This allows the sections to align with respective patch antenna elements and provides good cross-polar isolation.

In an embodiment of the invention, the antenna array assembly comprises a first and second elongate conductive wall 2,3 each being disposed symmetrically on either side of the linear array and parallel to a centre line of the linear array, on the same side of the ground plate as the linear array, and closer to the linear array than are the first and second elongate passive radiators 4, 5, wherein the first and second elongate conductive walls 2, 3 are electrically connected to the first face of the ground plate 1, 14 and are substantially perpendicular to the first face of the ground plate, protruding from the ground plate by less than a quarter of a wavelength at at least one operating frequency of the antenna array assembly. This has may improve the beam shape in conjunction with the passive radiators. The ground plate may comprise a base plate 1 to which the first and second elongate passive radiators are mounted and a raised section 14 disposed between the base plate and the patch radiator elements comprising at least part of the first face of the ground plate. This may provide a convenient base for mounting the patch radiator elements.

Figure 4:
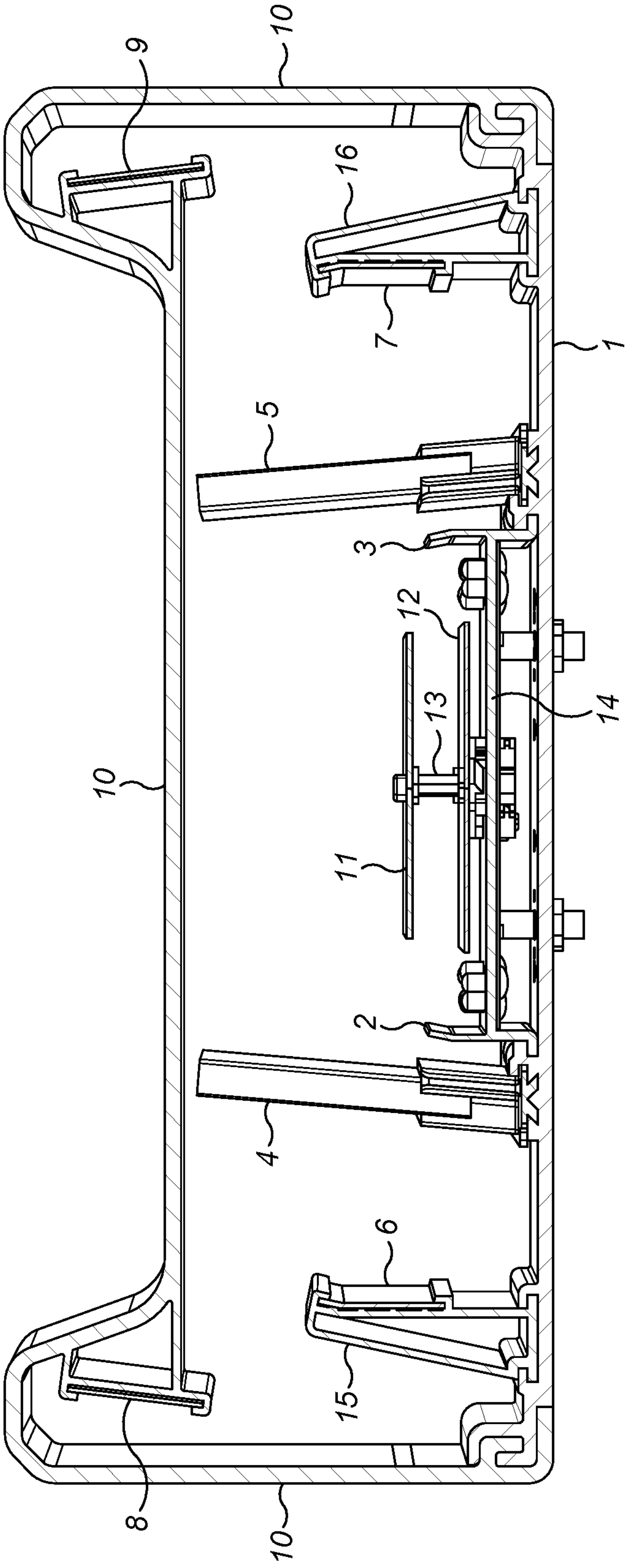
FIG. 4 shows a truncated oblique cross-sectional view of an embodiment of an antenna array assembly.
Figure 6:
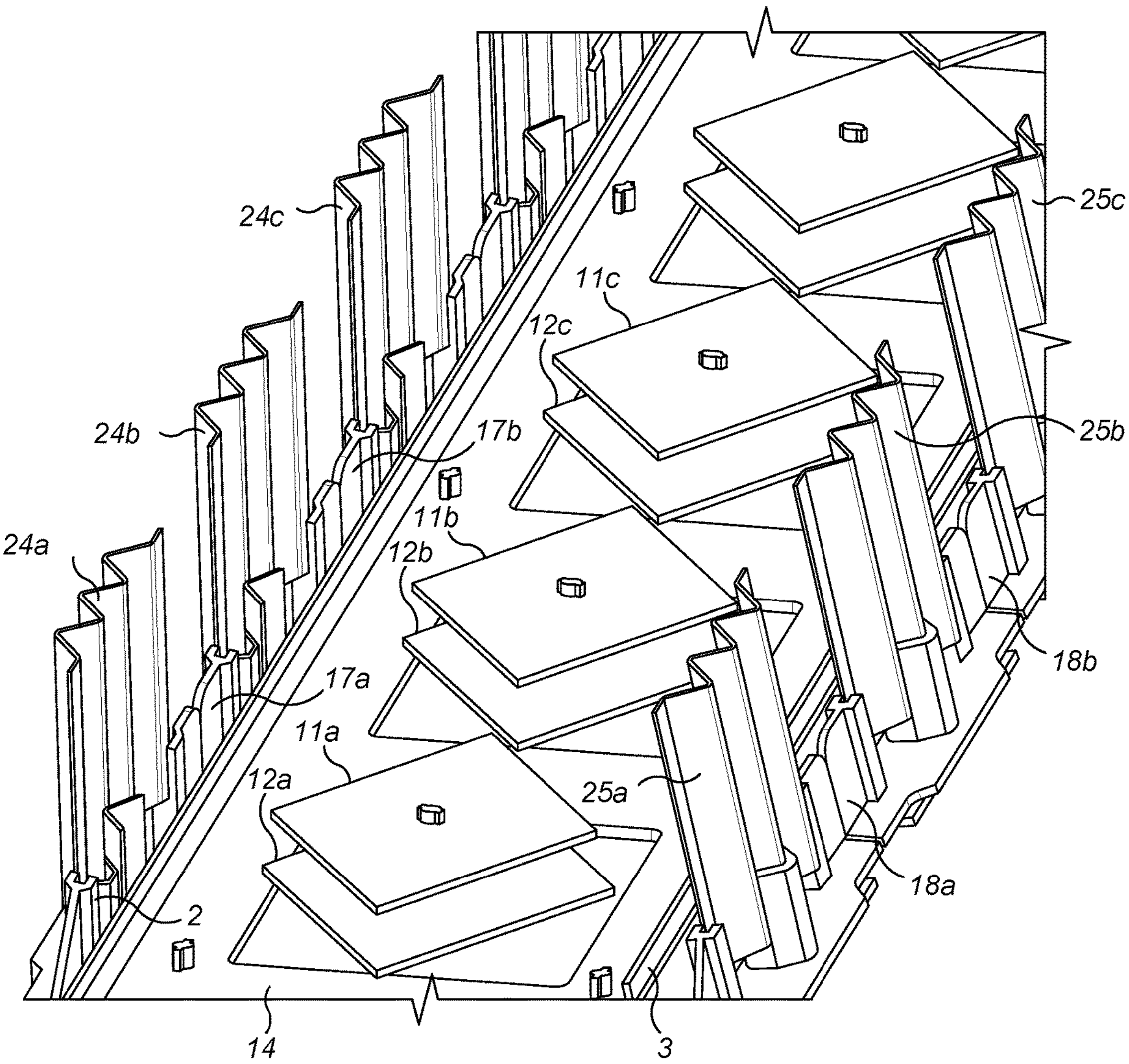
FIG. 6 is an oblique view of part of an embodiment of the antenna array assembly.

As illustrated by FIGS. 4 and 6, each patch radiator element may comprise a first planar part 12*a*-12*c* disposed in a spaced parallel relationship to the first face of the ground plate and a second planar part 13*a*-13*c* disposed in a spaced parallel relationship to the first planar part, on the side of the first planar part away from the first face of the ground plate. This may provide an improved radiated and/or received beam pattern.

As shown in FIG. 4, the antenna array assembly may be provided with another pair of elongate passive radiators 8, 9, electrically isolated from the ground plate and from each other, situated outside the first and second elongate passive radiators 4, 6 and each being narrower, and being offset from the ground plate so that they project further from the first face of the ground plate than do the first and second elongate passive radiators, despite being narrower. The second pair of elongate passive radiators 8, 9, which may be referred to as the third elongate passive radiator 8, and the fourth elongate passive radiator 9, may each be substantially perpendicular to the first face of the ground plate 1, 14. In alternative arrangements, the third and fourth elongate passive radiators may be inclined by an angle of up to about 15 degrees from the vertical, i.e. from the perpendicular, that is to say disposed at an angle of at least 75 degrees to the first face of the ground plate. In a typical arrangement the third and fourth elongate passive radiators may each tilt inwards towards the array of patch radiator elements at an angle of up to 10 degrees from perpendicular. The third and fourth elongate passive radiators 8, 9 may each comprise a single substantially planar conductive part, such as a strip of aluminium or another metal. However, there may be embodiments in which the third and fourth elongate passive radiators 8, 9 each comprise more than one substantially planar conductive part, and may comprise sections separated by gaps.

So, in some embodiments the substantially planar conductive parts are disposed at an angle of at least 75 degrees, and typically at substantially 85 degrees, to the first face of the ground plate, and electrically isolated from the ground plate, the third and fourth elongate passive radiators being disposed symmetrically on either side of the linear array and parallel to the centre line of the linear array, on the same side of the ground plate as the linear array, and further from the linear array than are the first and second elongate passive radiators. The centre line of the linear array of patch radiator elements may be referred to a long axis of the array. The long axis typically runs through the centres of the path radiator elements, as shown in FIG. 1 by the broken line.

As has already been mentioned, the inner pair of radiators is narrower than the outer pair, that is to say a width of each of the first and second elongate passive radiators 4, 5 measured in a direction pointing away from the first face of the ground plate is greater than a width of each of the third and fourth elongate passive radiators 8, 9 measured in a direction pointing away from the first face of the ground plate. Each of the each of the third and fourth elongate passive radiators 8, 9 is spaced from the first face of the ground plate 1, 14 by a first distance such that each of the third and fourth elongate passive radiators 8, 9 projects further from the ground plate than does each of the first and second elongate passive radiators 4, 6.

The combination of third and fourth passive radiators 8, 9 outside first and second passive radiators 4, 5, and with a width less than the width of the first and second radiators 4, 5, but protruding further from a ground plate than the first and second radiators, has been found to provide a broad main beam with a fast roll-off. The first and second radiators 4, 5 tend to broaden the beam, while the third and fourth passive radiators 8, 9 tend to give a faster cut off, counteracting the effect of the first and second radiators outside the main beam.

Particularly good performance may be achieved in some embodiments when the width of each of the first and second elongate passive radiators 4, 5 is in the range 0.4 to 0.6 wavelengths, and in one example substantially half a wavelength at at least one operating frequency of the antenna array assembly and the width of each of the third and fourth elongate passive radiators 8, 9 is in the range 0.2 to 0.4 wavelengths, and in an example substantially a quarter wavelength at at least one operating frequency of the antenna array assembly.

Also, particularly good performance may be achieved in some embodiments when each of the first and second elongate passive radiators 4, 5 is disposed at a distance of 0.4 to 0.6 wavelengths, and in an example substantially half a wavelength, away from the centre line of the linear array of patch radiator elements at at least one operating frequency of the antenna array assembly and each of the third and fourth elongate passive radiators 8, 9 is disposed at a distance of 0.8 to 1.2 wavelengths, and in an example one wavelength away from the centre line of the linear array of patch radiator elements at at least one operating frequency of the antenna array assembly.

Further improvements to the roll-off of the antenna response in azimuth outside the main beam may be achieved in some embodiments by the provision of a fifth and sixth elongate passive radiator 6, 7 as shown in FIG. 4, which may have a similar composition and width to the third and fourth elongate passive radiators 8, 9, which are situated closer to the ground plate 1, 14 than are the third and fourth elongate passive radiators 8, 9. As shown in FIG. 4, each of the fifth and sixth elongate passive radiators 6, 7 is situated symmetrically on either side of the linear array and parallel to the centre line of the linear array, on the same side of the ground plate as the linear array, and further from the linear array than are the first and second elongate passive radiators 4, 5. As shown in FIG. 4, each of the fifth and sixth elongate passive radiators 6, 7 is formed of a single planar conductive part and is orientated to be perpendicular to the first face of the ground plate 1, 14. In other embodiments, the fifth and sixth elongate passive radiators 6, 7 may be formed form more than one planar conductive part, and may be inclined away from being perpendicular to the ground plate. In some embodiments each of the fifth and sixth elongate passive radiators 6, 7 comprises one or more substantially planar conductive parts disposed at an angle of at least 60 degrees to the first face of the ground plate and is electrically isolated from the ground plate. Each of the each of the fifth and sixth elongate passive radiators 6, 7 is spaced from the first face of the ground plate 1 by a second distance such that each of the first and second elongate passive radiators 4,5 projects further from the ground plate 1,14 than does each of the fifth and sixth elongate passive radiators 6, 7.

In an embodiment of the invention, each of the fifth and sixth elongate passive radiators 6, 7 has a width in the range 0.2 to 0.4 wavelengths, and in an example substantially a quarter of a wavelength, at at least one operating frequency of the antenna array assembly.

FIGS. 1,2,4,6 and 7 show an antenna array assembly in an embodiment of the invention, which may be used as a sector antenna for an access point for operation in a cellular system having approximately 120 degree sectors. FIG. 4 shows a cross-sectional view of an embodiment of an antenna array assembly, the cross-section being in a plane perpendicular to the centre line of a linear array of patch radiator elements. FIG. 1 shows a plan view of part of an embodiment, showing the first passive radiator 4 as a series of sections 24*a*-24*d* and the second passive radiator 5 as a series of sections 25*a*-25*d*.

It may be seen from FIGS. 3-6 that a ground plate 1, 14 is provided across the base of the sector antenna, that is to say the antenna array assembly, extending substantially across the width of the antenna array assembly. The ground plate acts as a radio frequency ground reference for the antenna, and may comprise more than one part connected together electrically. In the embodiment shown, there is a central section 14, which acts as a support for the antenna elements, which are patch radiator elements 12*a*-12*d* and 11*a*-11*d*. As shown in FIG. 1, the patch radiator elements are orientated with each side of a square patch at substantially + or −45 degrees to the centre line of the antenna array, shown in FIG. 4 as a broken line. This is so that the patch radiator elements, in conjunction with the ground plate, each forms a patch antenna that radiates and/or receives with linear orthogonal polarisations orientated at +/−45 degrees to the centre line of the antenna array, as is well known in the art. Patch radiator elements may be fed with signals using probes connected to a feed network running, for example, below the central section 14 of the ground plate, or the patch radiators may be edge fed for example, or fed by signals passing through a aperture, according to a wide variety of patch antenna implementation arrangements well-known in the art. Typically, the antenna array arrangement used as a sector antenna in a cellular system would be mounted on a tower at an access point, which may be an access point of a fixed wireless access system, for example proving data connections for residential and commercial premises in a geographical area. The sector antenna may be mounted with the centre line of the antenna array orientated approximately vertically, but may be provided with a slight down tilt either by the mechanical fixing arrangement of by the phasing of the signals fed to the patch radiator elements. The patch radiator elements may each have a first patch part 12*a*-12*d*, typically a planar conductive metallic square in a spaced parallel planar relationship with the ground plate 1, 14 and a second, similar but typically slightly smaller, patch part 11*a*-11*d* situated in a planar parallel relationship with the first patch part, which may act as a director to shape the beam from the patch radiator element. The second patch part may be separated from the first patch part by a non-conducting spacer 13.

Figure 7:
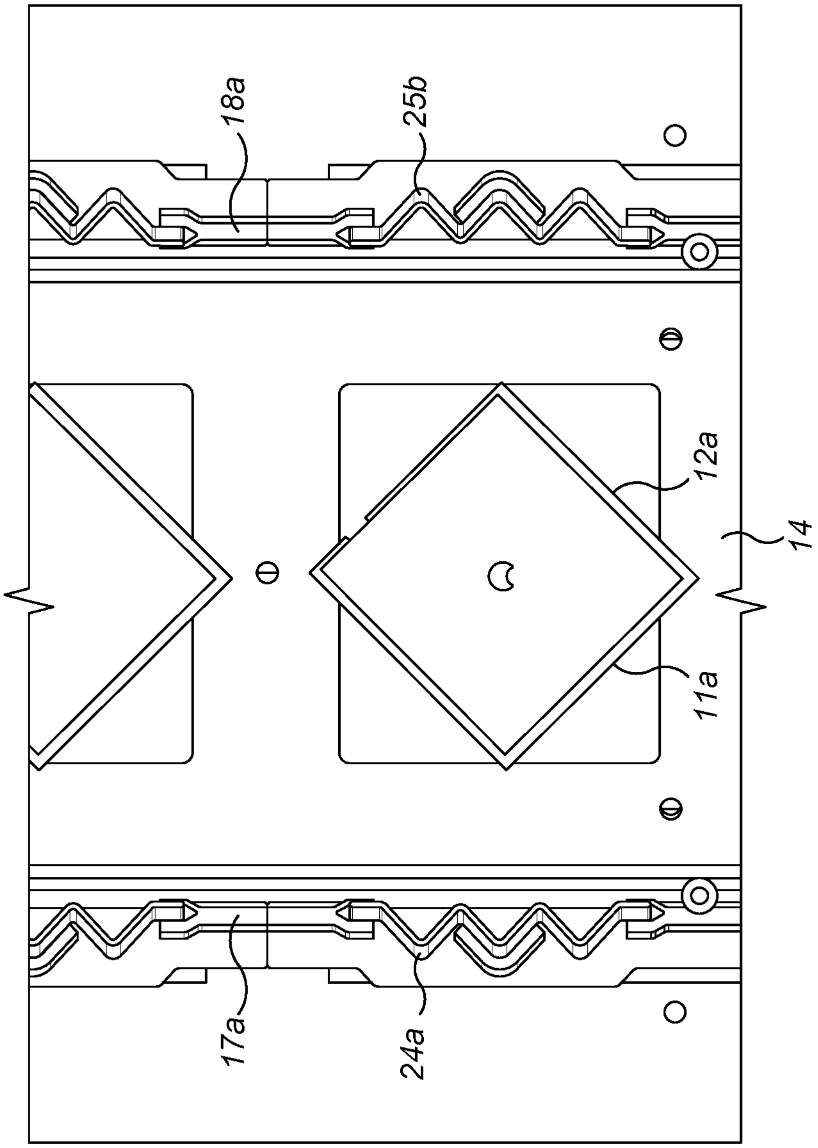
FIG. 7 is a plan view of part of an embodiment of the antenna array assembly.

As shown in particular in FIG. 6 and FIG. 7, the sections 24*a*-24*c* and 25*a*-25*c* which are typically metallic and electrically conductive, are attached to the ground plate by non-conductive support parts, which may be made from electrically insulating material such as plastic or a non-conductive composite material. As shown in FIGS. 6 and 7, there are supporting non-conductive spacers 17*a*, 17*b* and 18*a*, 18*b* provided between adjacent sections of the first and second elongate passive radiators 4, 5. In an alternative embodiment, the first and second elongate passive radiators may be attached to the radome instead of or in addition to being attached to the ground plate.

As also shown in FIG. 4, there are provided third and fourth elongate passive radiators 8, 9, which are supported in this embodiment by brackets formed in the non-conductive radome 10, which covers the antenna array assembly and gives environmental protection and allows radiation to pass in and out of antenna array assembly, as an antenna beam typically with a centre approximately perpendicular to the ground plate. For a sector antenna mounted with the centre line of the array approximately vertical, the azimuth direction is typically in the plane of the cross section of FIG. 4. In this example, the third and fourth elongate passive radiators 8, 9, are made of flat metallic strips with the long dimension extending parallel to the centre line of the array, that is to say extending into and out of the paper in the cross-sectional view of FIG. 4. In this example, the third and fourth elongate passive radiators are inclined towards each other slightly from perpendicular to the ground plate, by up to 10 degrees, and are spaced by substantially half a wavelength at at least one operating frequency from the ground plate.

As also shown in FIG. 4, there are provided fifth and sixth elongate passive radiators 6, 7, which are supported in this embodiment by non-conductive brackets 15, 16 which are mounted on the ground plate 1, 14. In this example, the fifth and sixth elongate passive radiators 6, 7 are made of flat metallic strips with the long dimension extending parallel to the centre line of the array, that is to say extending into and out of the paper in the cross-sectional view of FIG. 4. The fifth and sixth elongate passive radiators 6, 7, are situated in this example between three quarters of a wavelength and a wavelength from the centre of a patch antenna element, i.e. from the centre line of the array. In this example, the fifth and sixth elongate passive radiators are substantially perpendicular to the ground plate, and spaced by less than a quarter wavelength from the ground plate. The fifth and sixth elongate passive radiators may have a first substantially perpendicular section in relation to the ground plate and a second section connected to the first section which is inclined towards the array of radiator elements.

An aspect of some embodiments relates to using combination of three flanges symmetrically on the both sides of the linear patch array. The first flange has a height that corresponds to half of the wavelength at the centre frequency and separated by approximately half wavelength from the centre of a patch. This may help to create a wide beam pattern at the centre, for example with nominally 90 degrees of beamwidth, by combining the main radiation form the patch array plus the secondary radiation from the flanges. In an example, the beamwidth to a roll off point of 1.5 dB from peak may be 80 degrees, and the beamwidth to a roll off point of 3 dB may be in the range 90-100 degrees. The second set of two flanges may have a height equalling to quarter of the wavelength and separated by nearly one wavelength. These flanges are oriented at different heights and angles from the top patch. These two flanges help to create the required roll off in the pattern.

As may be seen from Figures land 2, at least some of the respective substantially planar conductive parts of the first and second elongate passive radiators 4, 5 may arranged in a respective zigzag arrangement in a cross-section taken in a plane parallel to the first face of the ground plane. As may be seen, the alternating planar conducting parts of each section 24*a*-24*d* and 25*a*-25*d* of the first and second elongate passive radiators 4, 5 are arranged as a zig zag. The combination of the zig-zag arrangement with the passive radiators may provide increased cross-polar isolation in combination with the broad beamwidth and fast roll-off. In the example shown, each section has three planar conducting parts at a first angle to the centre line of the linear array, and three planar conducting parts at a second angle to the centre line of the linear array, arranged alternately. In an example, at least two ridges of a respective elongate passive radiator are spaced by between one sixteenth and one quarter of a wavelength, and in the example shown substantially one eighth of a wavelength, at at least one operating frequency of the antenna array assembly. This has been found to provide good cross polar isolation. In the example shown, the first angle is substantially −45 degrees and the second angle is substantially +45 degrees.

In an embodiment of the invention, the edge of each of the third and fourth elongate passive radiators 8, 9 closest to the first face of the ground plate are substantially the same distance from the first face of the ground plate as are the edges of the first and second elongate passive radiators 4, 5 furthest from the first face of the first face of the ground plate. This may give an improved beam shape in terms of a broad beamwidth and fast roll-off in combination with the other claimed features.

The ground plate and the elongate passive radiators may be composed of a solid metal such as aluminium, or may be composed of a non-conductive material having a conductive coating. This may allow the ground plate to be light weight and to be moulded in a shape to include the conductive walls, which may be an economical manufacturing method. The non-conductive moulding may comprise a plastic material and the conductive surface may comprise copper.

Figure 3:
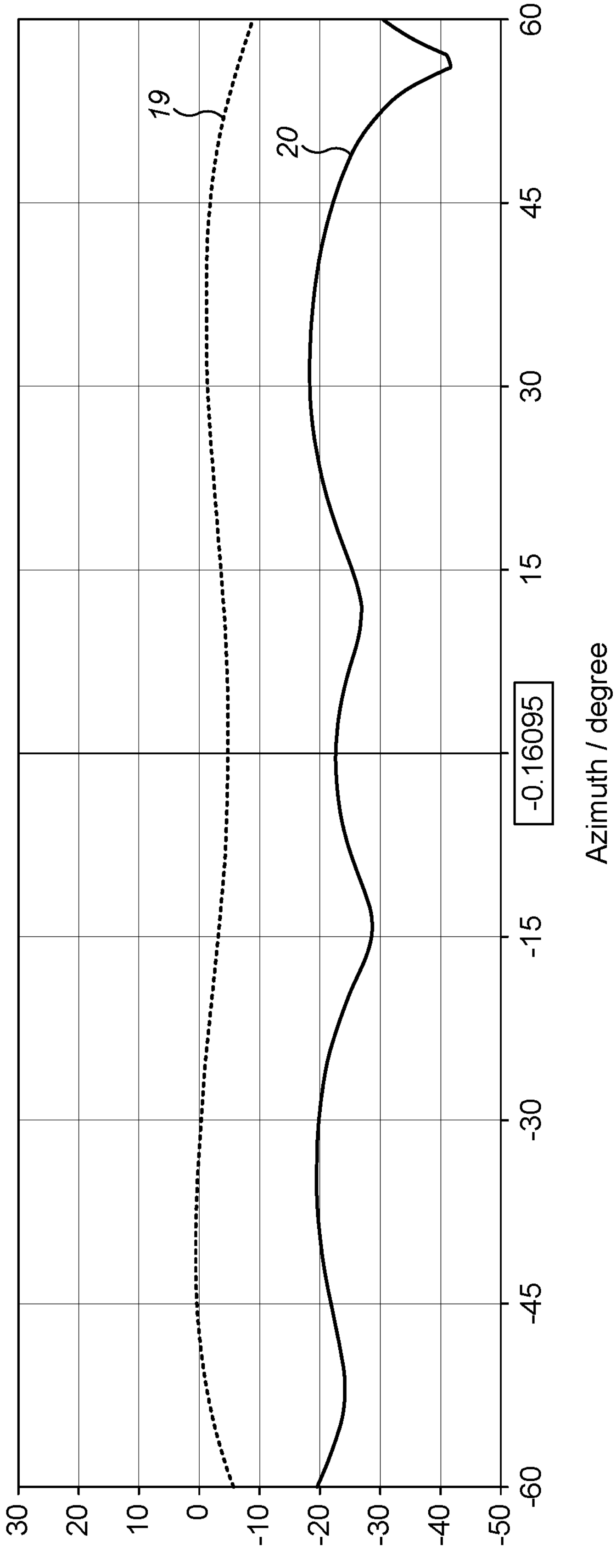
FIG. 3 is a plot showing cross-polar isolation for an embodiment of the antenna array assembly.

FIG. 3 shows plot showing cross-polar isolation 20 for the embodiment of the antenna array assembly illustrated in FIGS. 1,3,4,6 and 7. The horizontal scale is in azimuth and the vertical scale is in dB. Also shown 19 is a plot of cross-polar isolation for flat first and second elongate passive radiators, as opposed to the zig-zag first and second elongate passive radiators of the illustrated embodiment of FIGS. 1,3,4,6 and 7.

Figure 5:
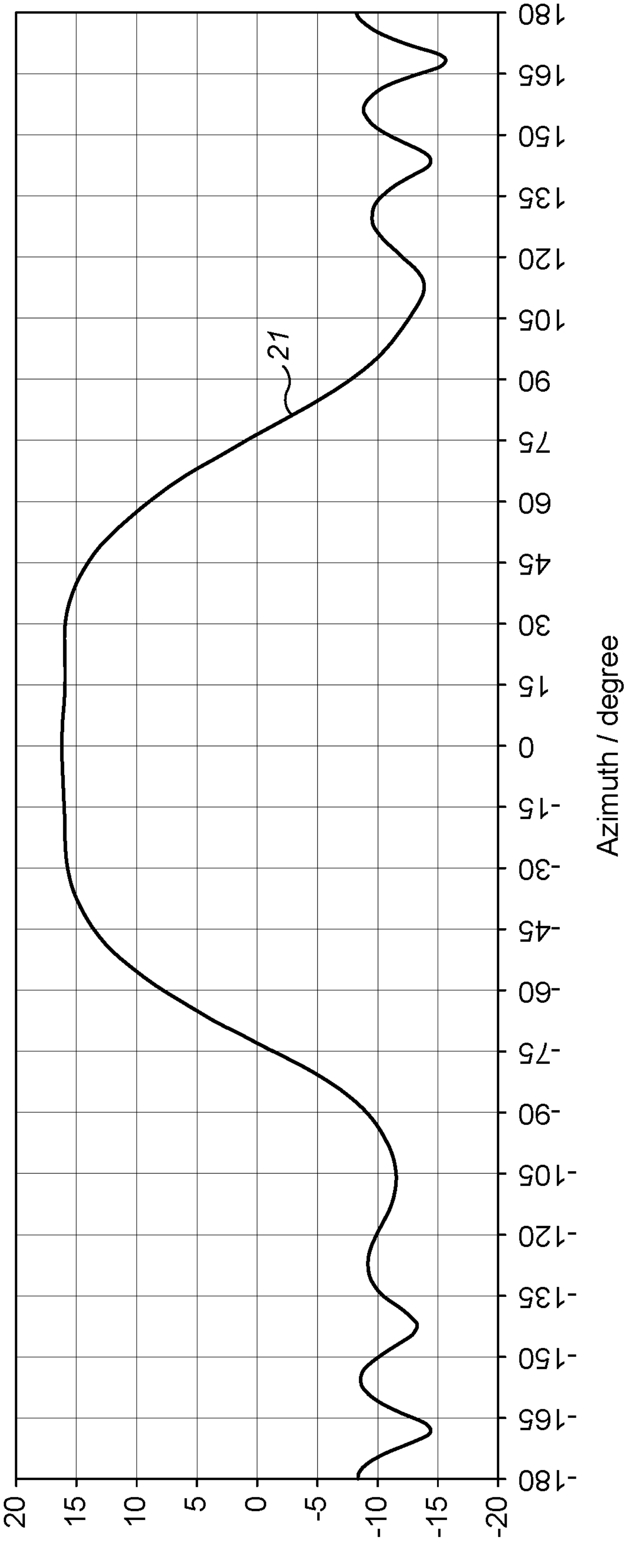
FIG. 5 shows a gain response of an embodiment of the antenna array assembly in azimuth.

FIG. 5 shows a radiation plot 21 for the embodiment of the antenna array assembly illustrated in FIGS. 1,3,4,6 and 7. The horizontal scale is in azimuth, which as has already been described is substantially in the plane of the cross-section of FIG. 4, with the peak of the beam radiating approximately in a perpendicular direction to the ground plate 1, 14. The vertical scale is in dBi. This illustrates that the main beam is flatter and broader than would be achieved by use of a conventional linear array of patch antenna elements for a sector antenna, and that the cut off outside the +/−60 degree points is faster than for a conventional sector antenna. In an example of a conventional antenna having a linear array of patch radiator elements, the −3 dB beamwidth may be 80 degrees, as opposed to over 90 degrees in the present case, whereas the −6 dB beamwidth may be similar in both cases, indicating that embodiments of the invention have a faster roll-off than a conventional antenna. This reduces the angular sector of the coverage region in which a user may receive signals at similar levels from two adjacent sectors, so increasing capacity in a cellular system with a frequency re-use factor of 1.

As is well known in the art, a patch radiator element disposed over a ground plate, forming a patch antenna, is a type of radio antenna with a low profile, which can be mounted on a flat surface. It may consist of a flat rectangular sheet or "patch" of metal, mounted over a larger sheet of metal called a ground plane. The assembly may be contained inside a plastic radome, which protects the antenna structure from damage. The metal sheet above the ground plane may be viewed as forming a resonant piece of microstrip transmission line with a length of approximately one-half wavelength of the radio waves. The radiation mechanism may be viewed as arising from discontinuities at each truncated edge of the microstrip transmission line. The radiation at the edges may cause the antenna to act slightly larger electrically than its physical dimensions, so in order for the antenna to be resonant, a length of microstrip transmission line slightly shorter than one-half a wavelength at the frequency may used to form the patch.

So, as has been described, embodiments of the invention may improve cross polarization discrimination in a dual slant polarized antenna with fast roll off. Conventionally, low cross polarization level is a limitation in a wide beam dual slant polarized antenna because of symmetric fields from +45 and −45 polarisations along the array axis. In order to solve this problem, embodiments mat provide field regeneration by using a zig zag flange, that is to say elongate passive radiator on the both sides of the patch radiators so that fields are symmetric with respect to the slant polarisation. This technique may give a significant improvement in the cross polarization discrimination without affecting the radiation pattern characteristics in comparison to a dual slant polarized antenna with straight flanges. Limiting the length of each flange section to λ/2 reduces coupling between adjacent patches. Using a Zig Zag Flanges length of λ/2 arranged by a gap of λ/4 for regenerating the field may produce a low cross polarization levels without disturbing the radiation pattern.

In embodiments of the invention, a low cross polarisation is achieved by an arrangement of Zig zag flanges in particular way to regenerate the maximum co polarized field. The flanges are optimized in length to λ/2 with inter flange gaps of λ/4 for retransmitting the maximum field. In an example, the flanges are height of 0.43λ and separated by 0.5λ from centre of the patch. This may result in a 15 dB improvement in cross polar levels.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

We claim:

1. An antenna array assembly, comprising:

a ground plate;

a linear array of patch radiator elements disposed in a spaced parallel relationship with a first face of the ground plate; and a first and second elongate passive radiator each comprising a plurality of conductive parts each disposed to be generally upstanding in relation to the first face of the ground plate and being electrically isolated from the ground plate, the first and second elongate passive radiators being disposed symmetrically on either side of the linear array and parallel to a centre line of the linear array, on the same side of the ground plate as the linear array, wherein at least some of the conductive parts of a respective elongate passive radiator are disposed in an arrangement having parallel ridges and grooves, in which, in a cross section in a plane parallel to the first face of the ground plate, the ridges extend towards the linear array and the grooves extend away from the linear array, and wherein at least some of the conductive parts are arranged as alternating first and second substantially planar conductive parts, the first substantially planar conductive parts being disposed at a first angle to the centre line of the linear array, and the second substantially planar conductive parts being disposed at a second angle to the centre line of the linear array, a transition between adjacent first and second substantially planar conductive parts forming a respective one of the ridges.

2. The antenna array assembly of claim 1, wherein the first and second substantially planar conductive parts are arranged in a zigzag arrangement in a cross-section taken in a plane parallel to the first face of the ground plane.

3. The antenna array assembly of claim 1, wherein an angle between the first and second substantially planar conductive parts is substantially a right angle.

4. The antenna array assembly of claim 1, wherein at least some of the conductive parts have a cross-section comprising part of a circle.

5. The antenna array assembly of claim 1, wherein each patch radiator element is configured to radiate at orthogonal polarisations substantially +/−45 degrees to the centre line of the linear array.

6. The antenna array assembly of claim 1, wherein a width of each of the first and second elongate passive radiators measured in a direction pointing away from the first face of the ground plate is in the range 0.4 to 0.6 wavelengths at a operating frequency of the antenna array assembly.

7. The antenna array assembly of claim 1, wherein the width of each of the first and second elongate passive radiators is substantially half a wavelength at at least one operating frequency of the antenna array assembly.

8. The antenna array assembly of claim 1, each of the first and second elongate passive radiators is disposed 0.4 to 0.6 wavelengths away from a centre line of the linear array of patch radiator elements at at least one operating frequency of the antenna array assembly, measured in a plane parallel to the first face of the ground plate.

9. The antenna array assembly of claim 1, each of the first and second elongate passive radiators is disposed substantially half a wavelength away from a centre line of the linear array of patch radiator elements at at least one operating frequency of the antenna array assembly.

10. The antenna array assembly of claim 1, wherein each of the first and second elongate passive radiators is inclined towards the linear array of patch radiator elements by an angle of up to 10 degrees from perpendicular to the first face of the ground plate.

11. The antenna array assembly of claim 1, wherein each of the first and second elongate passive radiators is composed of a series of sections, each comprising one or more conductive parts, wherein a gap is provided between each section of 0.2 to 0.4 wavelengths at at least one operating frequency of the antenna array assembly.

12. The antenna array assembly of claim 1, wherein each of the first and second elongate passive radiators is composed of a series of sections, each comprising one or more conductive parts, wherein a gap is provided between each section of substantially a quarter wavelength at at least one operating frequency of the antenna array assembly.

13. The antenna array assembly of claim 11, wherein each section has a length measured in a direction parallel to the centre line of the linear array in the range 0.4 to 0.6 wavelengths at at least one operating frequency of the antenna array assembly.

14. The antenna array assembly of claim 11, wherein each section has a length measured in a direction parallel to the centre line of the linear array of substantially a half wavelength at at least one operating frequency of the antenna array assembly.

15. The antenna array assembly of claim 1, wherein at least two ridges of a respective elongate passive radiator are spaced by between one sixteenth and one quarter of a wavelength at at least one operating frequency of the antenna array assembly.

16. The antenna array assembly of claim 1, wherein at least two ridges of a respective elongate passive radiator are spaced by substantially one eight of a wavelength at at least one operating frequency of the antenna array assembly.

17. The antenna array assembly of claim 1, comprising a first and second elongate conductive wall each being disposed symmetrically on either side of the linear array and parallel to a centre line of the linear array, on the same side of the ground plate as the linear array, and closer to the linear array than are the first and second elongate passive radiators, wherein the first and second elongate conductive walls are electrically connected to the first face of the ground plate and are substantially perpendicular to the first face of the ground plate, protruding from the ground plate by less than a quarter of a wavelength at at least one operating frequency of the antenna array assembly.

18. The antenna array assembly of claim 1, wherein the ground plate comprises a base plate to which the first and second elongate passive radiators are mounted and a raised section disposed between the base plate and the patch radiator elements comprising at least part of the first face of the ground plate.

19. The antenna array assembly of claim 1, wherein the each patch radiator element comprises a first planar part disposed in a spaced parallel relationship to the first face of the ground plate and a second planar part disposed in a spaced parallel relationship to the first planar part, on the side of the first planar part away from the first face of the ground plate.

20. An antenna array assembly, comprising:

a ground plate;

a linear array of patch radiator elements disposed in a spaced parallel relationship with a first face of the ground plate; and a first and second elongate passive radiator each comprising a plurality of conductive parts each disposed to be generally upstanding in relation to the first face of the ground plate and being electrically isolated from the ground plate, the first and second elongate passive radiators being disposed symmetrically on either side of the linear array and parallel to a centre line of the linear array, on the same side of the ground plate as the linear array, wherein at least some of the conductive parts of a respective elongate passive radiator are disposed in an arrangement having parallel ridges and grooves, in which, in a cross section in a plane parallel to the first face of the ground plate, the ridges extend towards the linear array and the grooves extend away from the linear array, and wherein at least some of the conductive parts have a cross-section comprising part of a circle.

21. An antenna array assembly, comprising:

a ground plate;

a linear array of patch radiator elements disposed in a spaced parallel relationship with a first face of the ground plate; and a first and second elongate passive radiator each comprising a plurality of conductive parts each disposed to be generally upstanding in relation to the first face of the ground plate and being electrically isolated from the ground plate, the first and second elongate passive radiators being disposed symmetrically on either side of the linear array and parallel to a centre line of the linear array, on the same side of the ground plate as the linear array, wherein at least some of the conductive parts of a respective elongate passive radiator are disposed in an arrangement having parallel ridges and grooves, in which, in a cross section in a plane parallel to the first face of the ground plate, the ridges extend towards the linear array and the grooves extend away from the linear array, and wherein each patch radiator element is configured to radiate at orthogonal polarisations substantially +/−45 degrees to the centre line of the linear array.

* * * * *